June 29, 1926.

J. R. ZYGALINSKI

POWER SHOVEL

Filed August 13, 1925

Patented June 29, 1926.

1,590,662

UNITED STATES PATENT OFFICE.

JOHN R. ZYGALINSKI, OF NEW HAVEN, CONNECTICUT.

POWER SHOVEL.

Application filed August 13, 1925. Serial No. 49,946.

Figure 1:
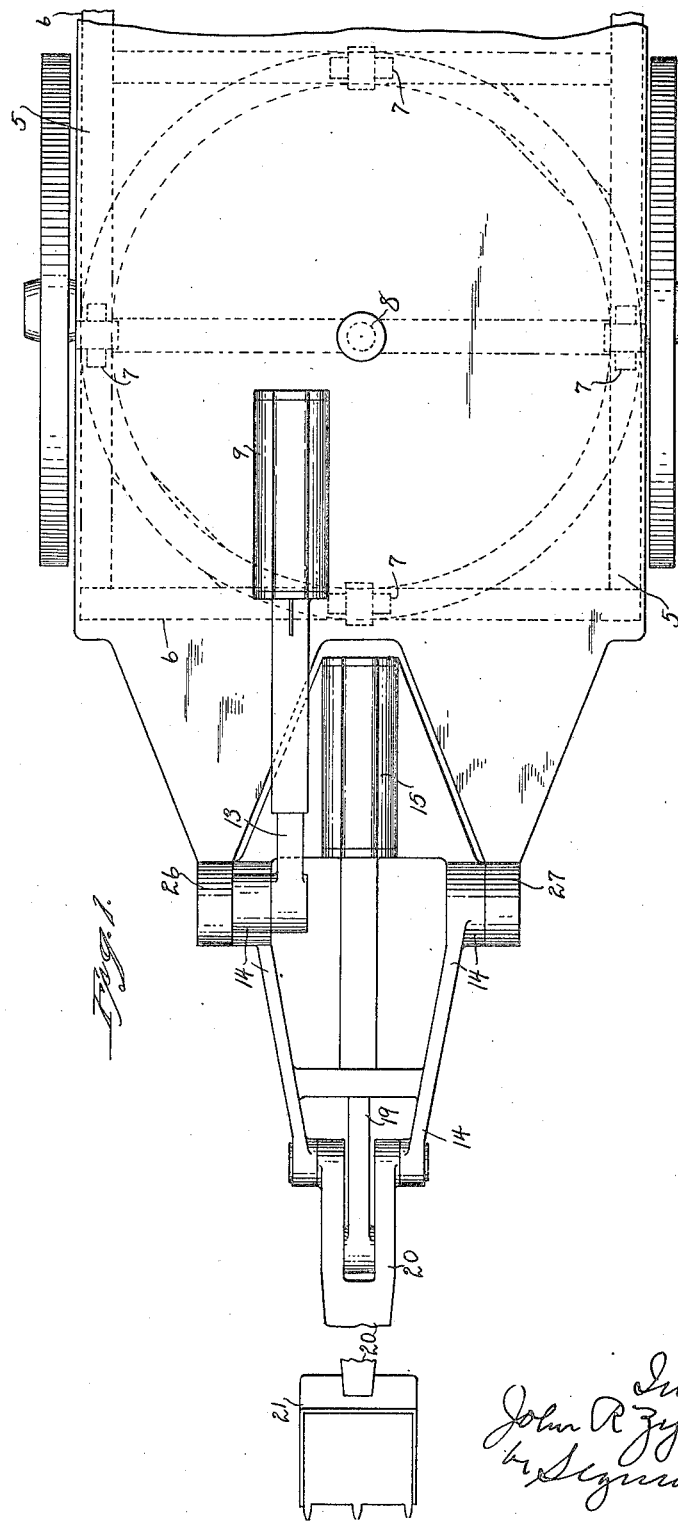
Fig. 1 is a plan view of a power shovel constructed in accordance with my invention.
Figure 2:
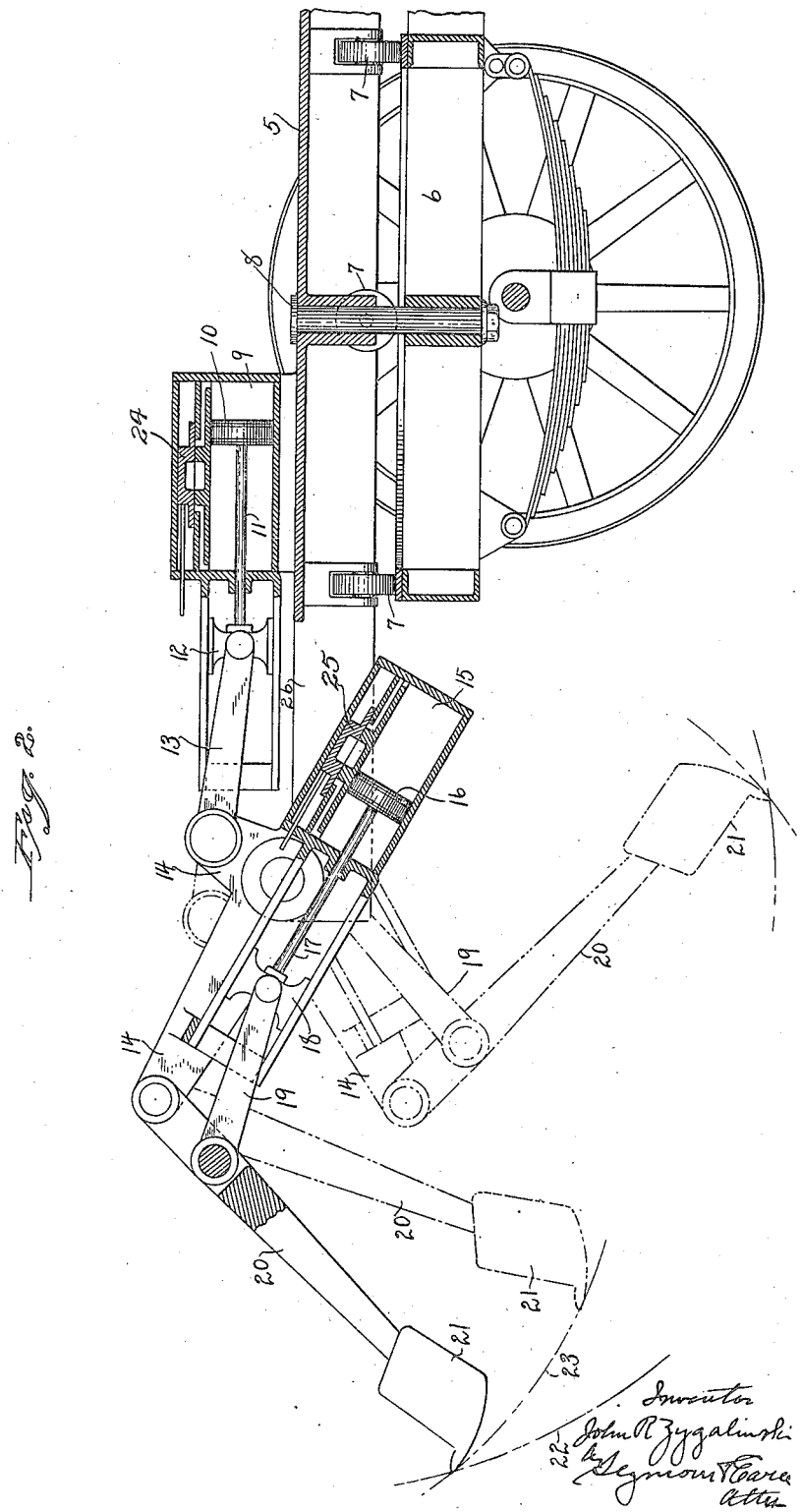
Fig. 2 is a side view, partly in section, of the same.

This invention relates to improvements in power shovels, such as are commonly used in grading and trench-digging, the object being to provide a shovel which may be mounted upon a suitable vehicle and which may be operated by hydraulic or other power readily controlled by valves, so that one man may readily operate the device, and the invention consists in the construction as hereinafter described and particularly recited in the claims.

In carrying out my invention, I mount a platform 5 upon a truck-body 6 of any approved construction, this platform being supported by rollers 7, so that the platform may turn upon a centrally-arranged post 8. Mounted on the platform is a horizontally-arranged cylinder 9 containing a piston 10, which may be operated by hydraulic, air or steam pressure, this piston, through its piston-rod 11, moving a horizontally-guided block 12. Pivotally connected with this block is a pitman 13, connected with and adapted to move a pivotally-mounted yoke 14, which is pivotally mounted in booms 26 and 27 projecting forward from the platform 5, the said yoke supporting a second cylinder 15 containing a piston 16 adapted to be operated by hydraulic, air or steam pressure, and this piston, through its piston-rod 17, moves a block 18, which is connected by a pitman 19 with a shovel-arm 20, which is pivotally connected with the yoke 14, this shovel-arm carrying a shovel 21 of usual construction.

The movement of the piston 10 rocks the yoke 14, so as to move the shovel 21 in an arc indicated by the line 22. Movement of the piston 16 moves the shovel-arm 20, so as to move the shovel 21 on the line 23, so that between the movement of the yoke by the piston 10, and the movement of the shovel-arm by the piston 16, the position of the shovel may be controlled at any point within the limits of its movement, and these positions are readily controlled by the operator through valves 24 and 25 by levers, or other means not shown.

I claim:—

1. A power shovel, comprising a rotatable platform, a cylinder horizontally mounted on the platform, said platform having forwardly-projecting booms, a piston in said cylinder, a yoke pivotally connected with the outer ends of the said booms, connection between the piston and yoke for rocking the yoke, a shovel-arm pivotally connected with said yoke, a cylinder supported by said yoke, a piston in said cylinder and connected with the shovel-arm below its pivotal point, whereby the shovel-arm may be turned on its pivot.

2. A power shovel, comprising a vehicle-body, a platform rotatably mounted on said vehicle-body, said platform provided with forwardly-projecting booms, a yoke pivotally mounted in said booms, a shovel-arm pivotally connected with said yoke, a cylinder horizontally mounted on said platform and containing a piston adapted to be moved back and forth and connected with the said yoke to rock the same, a cylinder mounted on said yoke, and a piston in said cylinder adapted to be moved back and forth, and connections between this piston and the shovel-arm below its pivotal point, whereby the movement of the said piston will move said shovel-arm.

In testimony whereof, I have signed this specification.

JOHN R. ZYGALINSKI.